(12) United States Patent
Gupta

(10) Patent No.: US 7,424,493 B2
(45) Date of Patent: Sep. 9, 2008

(54) REPLICATION-BASED PROPAGATION MECHANISM FOR PIPELINES

(75) Inventor: Amit Gupta, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 11/055,946

(22) Filed: Feb. 11, 2005

(65) Prior Publication Data

US 2005/0149581 A1 Jul. 7, 2005

Related U.S. Application Data

(63) Continuation-in-part of application No. 10/420,239, filed on Apr. 21, 2003, and a continuation-in-part of application No. 10/420,134, filed on Apr. 21, 2003.

(51) Int. Cl.
*G06F 12/00* (2006.01)

(52) U.S. Cl. ........................ 707/201; 707/204

(58) Field of Classification Search ............... 705/26; 707/10, 204, 201
See application file for complete search history.

(56) References Cited

U.S. PATENT DOCUMENTS

| | | | |
|---|---|---|---|
| 5,678,002 A | 10/1997 | Fawcett et al. | |
| 5,692,063 A | 11/1997 | Lee et al. | |
| 5,748,980 A | 5/1998 | Lipe et al. | |
| 5,787,246 A | 7/1998 | Lichtman et al. | |
| 5,799,306 A * | 8/1998 | Sun et al. | 707/102 |
| 5,809,329 A | 9/1998 | Lichtman et al. | |
| 5,815,731 A | 9/1998 | Doyle et al. | |
| 5,946,043 A | 8/1999 | Lee et al. | |
| 5,982,438 A | 11/1999 | Lin et al. | |
| 6,233,017 B1 | 5/2001 | Chaddha | |
| 6,404,814 B1 | 6/2002 | Apostolopoulos et al. | |
| 6,470,469 B1 | 10/2002 | Chou et al. | |
| 6,510,177 B1 | 1/2003 | De Bonet et al. | |
| 6,546,143 B1 | 4/2003 | Taubman et al. | |
| 6,597,739 B1 | 7/2003 | Li et al. | |
| 6,678,419 B1 | 1/2004 | Malvar | |
| 6,700,933 B1 | 3/2004 | Wu et al. | |
| 6,735,345 B2 | 5/2004 | Lin et al. | |
| 6,889,229 B1 * | 5/2005 | Wong et al. | 707/102 |
| RE39,317 E * | 10/2006 | Sakagawa | 370/395.54 |
| 7,177,825 B1 * | 2/2007 | Borders et al. | 705/26 |
| 2002/0174142 A1 * | 11/2002 | Demers et al. | 707/509 |

OTHER PUBLICATIONS

Alex Gorelik, Sybase Replication Server, 1994, ACM, p. 469.*
Mar-Elia, "Viewing and Manipulating the Registry," Windows IT Library, Jul. 2000, 44 pages.

* cited by examiner

*Primary Examiner*—Hosain T Alam
*Assistant Examiner*—Amy Ng
(74) *Attorney, Agent, or Firm*—Senniger Powers LLP

(57) ABSTRACT

Processing database objects via a database pipeline having a plurality of stages. The invention provides a replication mechanism for propagating selected data from a database in one stage to a database in another stage without accessing a file system. Each database stage may have a plurality of input and output pipes. The invention enables a user to select a subset of the database objects in each stage for propagation to a subsequent stage.

13 Claims, 10 Drawing Sheets

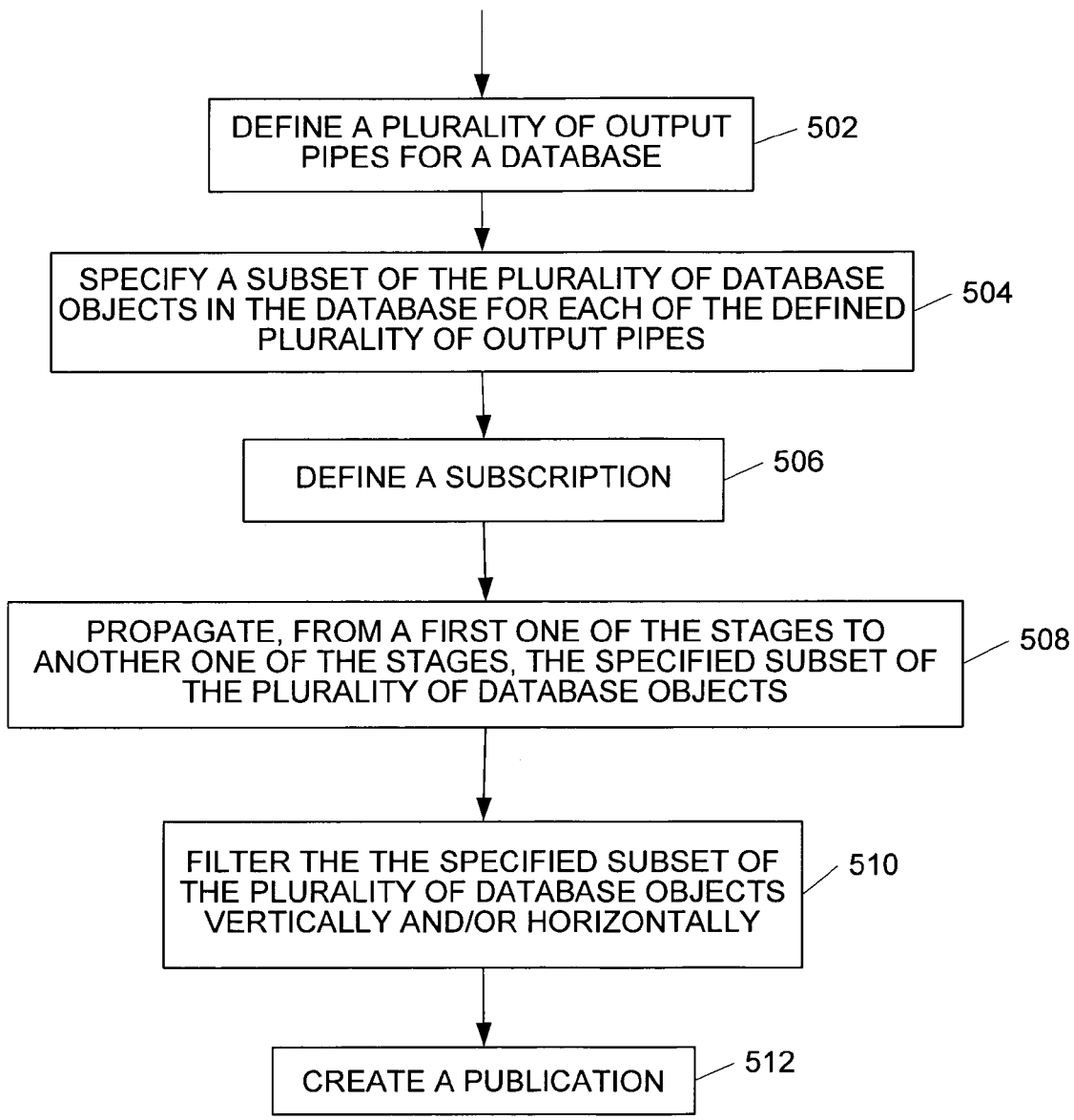

REPLICATION-BASED PROPAGATION MECHANISM FOR PIPELINES

CROSS-REFERENCE TO RELATED APPLICATIONS

This application is a continuation-in-part of co-pending U.S. patent application Ser. No. 10/420,239, filed Apr. 21, 2003 entitled "Producing a Pipeline," and co-pending U.S. patent application Ser. No. 10/420,134, filed Apr. 21, 2003, entitled "Asynchronous Pipeline," both of which are hereby incorporated by reference herein.

TECHNICAL FIELD

Embodiments of the present invention relate to the field of data processing. In particular, embodiments of this invention relate to propagating data between stages in a pipeline through replication.

BACKGROUND OF THE INVENTION

With the emergence of the Internet and the interconnection of devices utilized in most every aspect of modern life, a wide range of data has become available of an almost limitless diversity. Internet content may be thought of as data that has intrinsic value to a subset of users of web sites, internet client devices, and the like. This data can be configured to more efficiently address and therefore be of greater value to the subset of users. In many cases, this greater value is created as a result of some type of data processing, typically in the form of a sequence of stages or steps, which may be implemented through use of a pipeline. A pipeline includes one or more stages, which may provide manipulation of sets of data, combine multiple sets of data into a single set of data through interlinking related data, and the like. Often, an output of a stage of a pipeline will serve as input to multiple subsequent stages, each of which may represent a beginning of a new pipeline and/or a continuation of the same pipeline. Since each pipeline stages relies on the availability of data from a preceding stage in the pipeline, it is very important to have a reliable system for consuming input data and producing output data for subsequent stages.

Because of the wide range of data available from the Internet, systems utilizing a large number of pipelines may be utilized to manipulate the data through use of the various stages. In some systems, for example, pipelines are interconnected with other pipelines through interconnected stages, resulting in a large and intricate system of pipelines, such that execution of the pipelines demands a significant amount of computer resources. Execution of pipelines may include performing services included in stages of the pipeline, such as interlinking related data, and the like. Because of business demands such as timeliness due to a competitive nature of a particular industry, execution of stages for a pipeline is accomplished as fast as possible with a high reliability to remain competitive in the industry.

Previous systems employ attach and detach operations to propagate data across stages in a pipeline. However, these previous systems do not scale well to large pipelines. For example, the detach operation detaches the whole database because the detach operation does not support partial data propagation. Because a subsequent stage may not require all the database objects, maintaining multiple copies of unwanted data is a waste of disk resources. Further, the previous system consumes extra network bandwidth to copy the large files across stages. There is a need for a system that avoids transferring unneeded data by allowing a subset of the objects in a database to be selected and propagated. Further, the detach and attach operations require use of the file system to copy the data to the next stage. Accessing the file system to copy data slows the data propagation and requires additional input/output bandwidth.

In addition, previous systems allow multiple input pipes but only one output pipe per stage because of the previous propagation mechanisms. To support multiple output pipes in the previous systems, the number of databases needed increases significantly. Since each input pipe is an attached database and each output pipe is a detached database, there is one database needed for each input pipe and one database needed for each output pipe. So if a particular stage in a pipeline consumes N input pipes and produces M output pipes, there may be N+M+1 databases needed to process a single stage. When running large quantities of stages on a computing device, the complexity and disk space requirements for the pipeline increase significantly. Further, because all the input pipes are attached as a database, inefficient cross-database queries are needed to process the input data and produce the output.

Accordingly, a scalable and efficient system for propagating data from one content pipeline to another is desired to address one or more of these and other disadvantages.

SUMMARY OF THE INVENTION

Embodiments of the invention communicate data between different stages of a content pipeline. In an embodiment, the invention reliably and efficiently propagates data between different database pipeline stages using replication. The invention provides a reliable system for consuming input data and producing output data for subsequent stages to use. In addition, the invention is significantly more scalable than previous methods because the invention enables the configuration of a subset of database objects in an abstract way to any quantity of stages. This reduces the demand on disk space by eliminating the need to retain unwanted database objects and eliminating the need to copy data when propagating to a subsequent stage of the pipeline.

Further, the invention allows for the creation of multiple input pipes and multiple output pipes from a single database. This allows a single database to be used for all the output pipes. Use of a single database reduces the disk storage requirements, execution time, and overall complexity of the pipeline implementation. The invention additionally reduces input/output usage because the propagation occurs within the database without a need to access a file system.

In accordance with one aspect of the invention, a method processes a plurality of database objects in a database via a database pipeline. The database pipeline has a plurality of stages. Each of the plurality of stages has at least one database associated therewith. The database has one or more input pipes and a plurality of output pipes. The method includes defining a plurality of output pipes for a database. The database has a plurality of database objects stored therein. The method further includes specifying a subset of the plurality of database objects in the database for each of the defined plurality of output pipes and defining a subscription as a function of the specified subset of the plurality of database objects. The method further includes propagating, from a first one of the stages to another one of the stages, the specified subset of the plurality of database objects as a function of the defined subscription and creating a publication as a function of the propagated subset of the plurality of database objects.

In accordance with another aspect of the invention, one or more computer-readable media have computer-executable components for processing a plurality of database objects in a database. The components include a configuration module for defining a plurality of output pipes for one database in a stage in a pipeline. The database has a plurality of database objects stored therein. The components also include a selection module for specifying a subset of the plurality of database objects in the database for each of the plurality of output pipes defined by the configuration module. The components further include a replication module for propagating, from the stage to another stage, the subset of the plurality of database objects specified by the selection module.

In accordance with still another aspect of the invention, a system representing a pipeline includes a configuration service for selecting a subset of a plurality of database objects in a database. The system also includes a first stage for executing a first data processing service to output the subset of the plurality of database objects selected by the configuration service. The database is associated with the first stage. The system also includes a second stage for executing a second data processing service. The second stage has another database associated therewith. The system also includes a data host, communicatively coupled to the first and second stages, for storing the selected subset of the plurality of database objects such that the executing of the first data processing service is asynchronous with respect to the executing of the second data processing service. The system further includes a propagation mechanism for replicating the subset of the plurality of database objects stored in the data host to the other database associated with the second stage.

Alternatively, the invention may comprise various other methods and apparatuses.

Other features will be in part apparent and in part pointed out hereinafter.

BRIEF DESCRIPTION OF THE DRAWINGS

FIG. 5 is an exemplary flow chart illustrating operation of software implementing an embodiment of the invention.

Corresponding reference characters indicate corresponding parts throughout the drawings.

DETAILED DESCRIPTION OF THE INVENTION

In an embodiment, the invention propagates data between content pipeline stages. Each content pipeline stage includes one stage with one or more input pipes, processing and one or more output pipes. After a stage completes its processing, the stage generates the outputs to be consumed by the subsequent stages. The invention enables a developer, user, or the like to configure a subset of database objects in each database for individual output. Selectively defining the articles of data in any output pipe reduces disk space usage and network traffic levels.

The invention also supports renaming or prefixing similarly-named database objects coming from different sources. In this manner, the source, vendor, or other supplier of the database objects may be identified by the prefix associated with the source in the name of the database objects. Further, renaming the database objects allows data from different sources with the same schema to be stored within a single database. For example, similar data may be coming from more than one provider and the renaming enables the data to be distinguished on the basis of a prefix used in the renaming. The pipeline may be configured from a configuration file (e.g., written in extensible markup language). Appendix A lists the contents of an exemplary configuration file.

In general, a propagation mechanism according to the invention is operable with one or more of the following pipelines: a content selection pipeline, an event processing pipeline, a direct mailer pipeline, an order processing pipeline, a product pipeline, a plan pipeline, a purchase pipeline, and any system where data is flowing from one stage to another stage. In one embodiment, a propagation mechanism according to the invention communicates television guide listing data, music metadata, or the like from one stage to another in a pipeline.

The invention may include a system of interconnected pipelines having a plurality of stages that utilize data stores to provide asynchronous operation of stages both with respect to other stages within the pipeline as well as to stages included in other pipelines. A plurality of pipelines may be provided, such as a first pipeline, second pipeline, third pipeline, and fourth pipeline, each of which target specific types of data. The pipelines are connected so that data from each of these pipelines may be combined and/or propagated across other pipelines to provide desired output.

Figure 1:
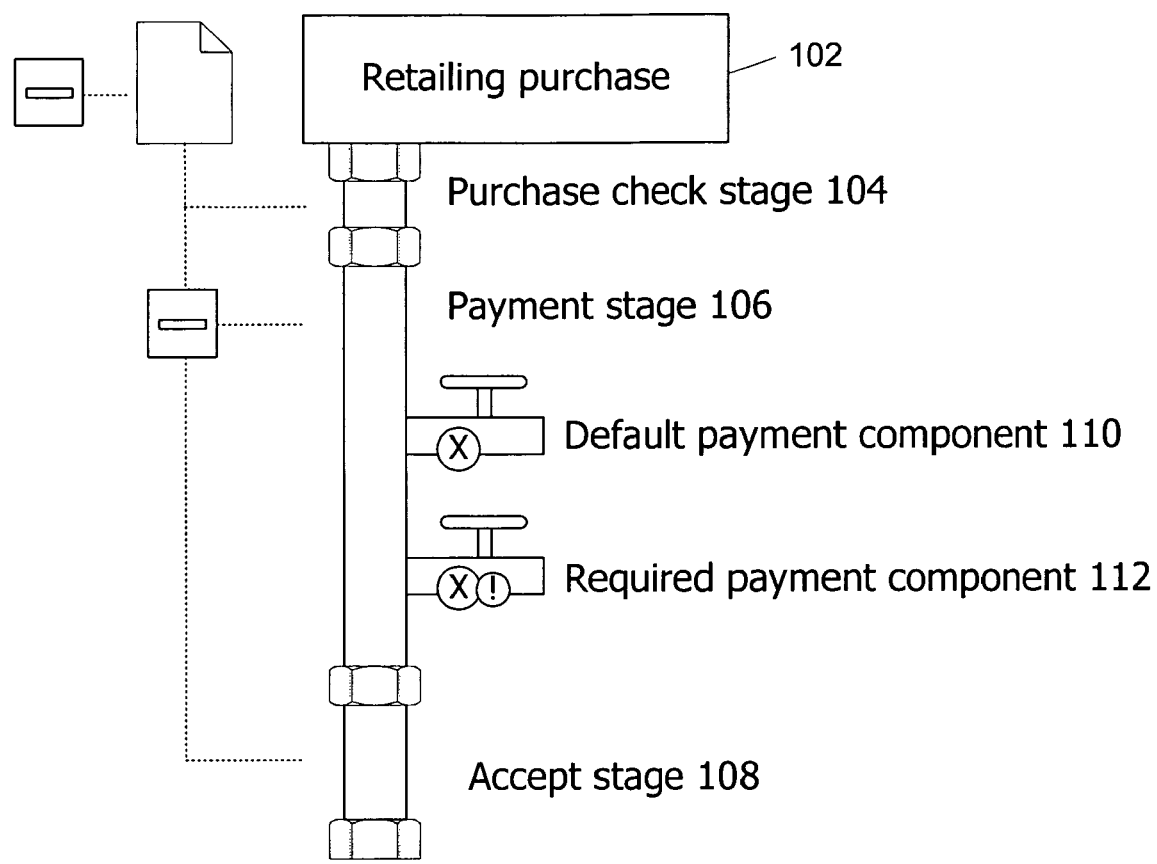
FIG. 1 is an exemplary embodiment of a retailing purchase pipeline.

Referring first to FIG. 1, an exemplary embodiment of a retailing purchase pipeline 102 is shown. The retailing purchase pipeline 102 includes a purchase check stage 104, a payment stage 106, and an accept stage 108. The payment stage 106 includes a default payment component 110 and a required payment component 112.

Data stores may be provided in a variety of ways to provide asynchronous functionality of stages both within a pipeline and between pipelines. Asynchronous pipeline operation is provided so that stages of the pipeline are not dependent on subsequent stages to perform data processing. The first stage may process a next available set of data without waiting to transfer processed data to the second stage by storing the processed data in the data store. Thus, once input parameters of a stage are met, such as by receiving data for processing, the stage is able to process data. For example, data may be stored from the first stage and data may also be communicated to the second stage at the same time. Therefore, the first and second stages may interact with the data store without interfering with each other.

A data store, data host, or the like, may be implemented as a logical storage device, which may include one or more hardware data storage devices, such as RAM, storage media including hard disks and removable media, and the like. For example, a data host may include a first storage device that receives output of a third stage of the first pipeline and a second storage device configured to receive output of a second stage of the second pipeline. Both the first and second storage devices may be accessed by a third stage of the second pipeline as a data host. Although interconnection of exemplary data storage devices is contemplated, data storage devices may take a variety of configurations to implement a data host. Additionally, a data host may include logic to provide additional functionality. The data host may use the logic to perform a variety of functions. For example, the data host may clone sets of data, replace a set of data, aggregate sets of data, and the like.

Figure 2:
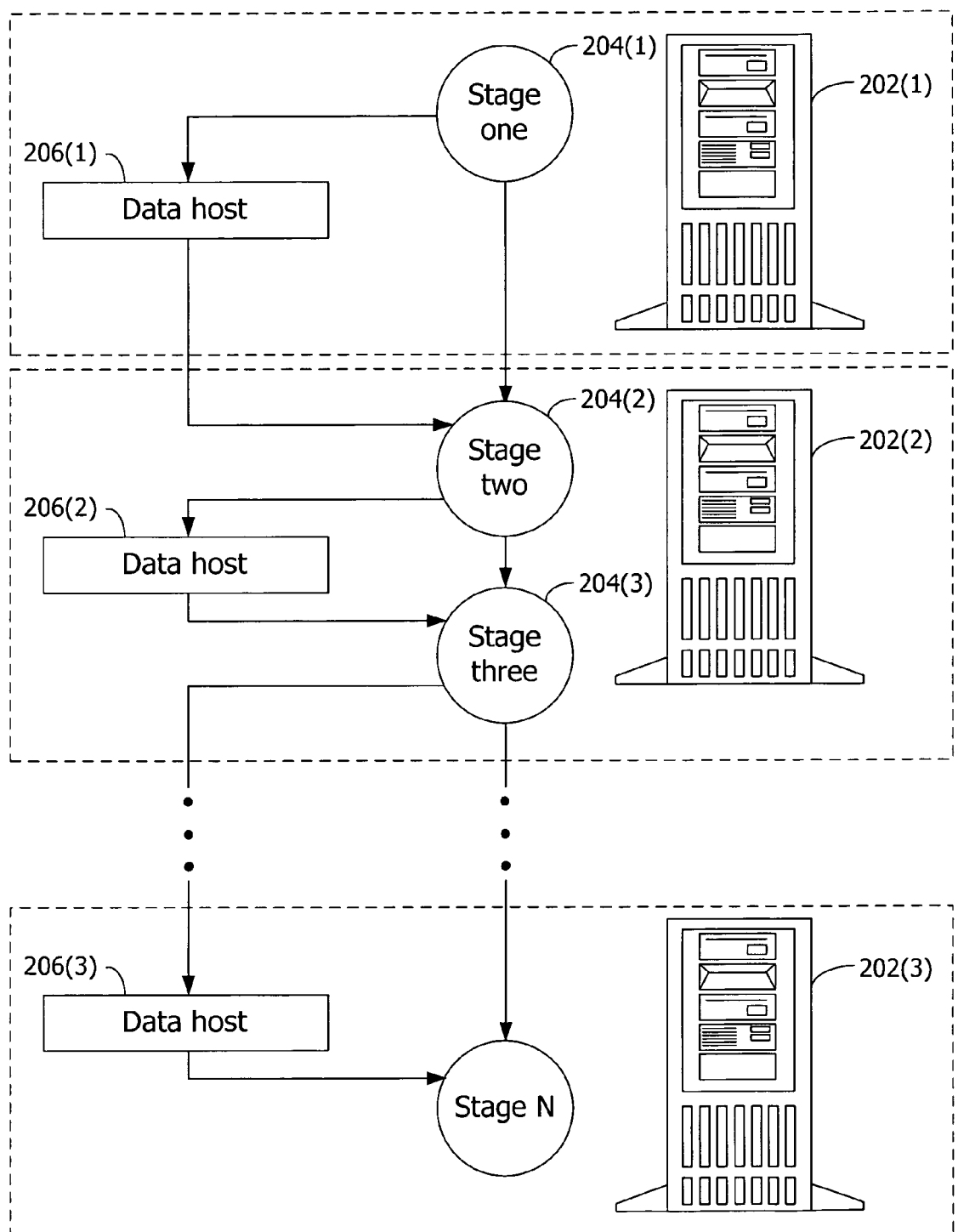
FIG. 2 is an exemplary block diagram illustrating a pipeline having multiple stages.

Referring next to FIG. 2, an exemplary block diagram illustrates a pipeline having multiple stages. In FIG. 2, a system is configured for implementing a pipeline. Systems implementing pipelines may be configured in a variety of ways. For instance, considerations such as processing power, network connections, type of data, destination for data, and the like, may be addressed to provide a system of pipelines which correspond to a developer's needs. As shown in FIG. 2, a system implementing a pipeline may include multiple computers, computing devices, or the like 202(1), 202(2), 202(3) implementing first, second and third stages 204(1), 204(2), 204(3) and data stores 206(1), 206(2), 206(3). A first stage 204(1), and a first data host 206(1) communicatively coupled to the first stage 204(1), are implemented on a first computer 202(1). The first computer 202(1) is communicatively coupled to a second computer 202(2) which operates to host a second stage 204(2), a third stage 204(3), and a second data host 206(2). The second stage 204(2), implemented on the second computer 202(2), may access the first data host 206(1) implemented on the first computer 202(1), which receives the output of the first stage 204(1). Likewise, the third stage 206(3) transfers its output to a third data host 206(3) implemented on a third computer 202(3).

In one embodiment (not shown), a data host is not provided between every stage of the pipeline, but rather is provided between stages in which a previous stage processes data faster than a subsequent stage. For example, a stage which processes data faster than a previous stage (e.g., a second stage) may be directly connected to the second stage so that a data pathway is provided without using a data host. Such a configuration may be useful to conserve hardware and software resources. However, in additional implementations, data stores may also be provided before and after every stage in the pipeline.

Figure 3:
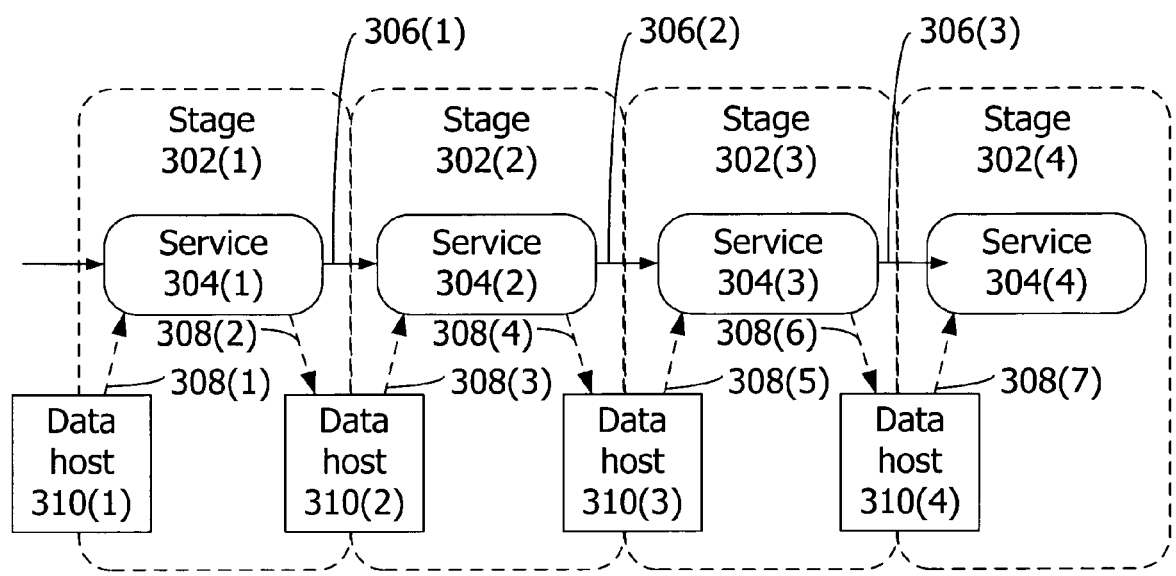
FIG. 3 is an illustration of an exemplary implementation wherein a pipeline is constructed as a collection of stages and services.

Referring next to FIG. 3, an illustration of an exemplary implementation shows a pipeline constructed as a collection of stages and services. FIG. 3 is an illustration of an implementation in which a developer constructs a pipeline from a plurality of stages 302(1), 302(2), 302(3), and 302(4). The developer interacts with the stages 302(1)-302(4) to specify characteristics of each of the stages 302(1)-302(4) to construct the pipeline. An interoperability manager, configuration service, or the like provides the corresponding details for generation of each such stage of the pipeline 300 based on the specified characteristics. For example, the developer specifies data processing to be performed by a first service 304(1) of a first stage 302(1) of the pipeline. The developer then specifies data processing to be performed by second, third and fourth services 304(2)-304(4) of the second, third and fourth stages 302(2)-302(4), respectively. In one embodiment, processing data by a stage refers to executing a data processing service such as any of services 304 by a stage. The developer may provide a desired order for execution of the stages 302(1)-302(4) by specifying interconnections. For example, the developer may specify that the first stage 302(1) outputs data to the second stage 302(2), and continue in a like manner to the third stage 302(3), which is output to a fourth stage 302(4).

The interoperability manager provides control pathways 306(1), 306(2), and 306(3), shown as solid arrows in the illustration, and data pathways 308(1)-308(7), shown as dashed arrows, between the services 304 based on the specified interconnections of the stages 302(1)-302(4). By providing the control pathways and data pathways, the pipeline is automatically generated. For instance, the interoperability manager may provide a first control pathway 306(1) by supplying a location, to the second service 304(2), of where to retrieve control information from the first service 304(1). The interoperability manager may provide the first control pathway 306(1) by supplying a location, to the first service 304(1), of where to transfer control information to the second service 304(2). The location may include a memory address, network path, URL, and the like.

The interoperability manager automatically provides data pathways 308(1)-308(7) between the services 304 in a similar manner. However, the data pathways 308(1)-308(7) may include data hosts 310(1)-310(4). Therefore, the interoperability manager may provide locations of the data hosts 310(1)-310(4), such as an address in memory, network path, URL, and the like. The interoperability manager may include or coordinate with a propagation mechanism for replicating data between the stages 302.

Interconnections may be specified at varying levels of granularity. For instance, a developer may specify an interconnection between stages 302(1)-302(4). The interoperability manager then generates control pathways 306(1)-306(4) and data pathways 308(1)-308(7) automatically between the services 304(1)-304(4).

A greater level of granularity may also be provided. For example, a designer may specify a second data host 310(2) to act as a sink for the first service 304(1) of the first stage 302(1). The interoperability manager may automatically generate the second data pathway 308(2) by providing a location of the data host 310(2) to the first service 304(1). Similar granularity may also be provided to automatically generate the first control pathway 306(1) by specifying that the second service 304(2) of the second stage 302(2) is to receive control information from the first service 304(1).

In one embodiment, the invention includes a system representing a pipeline such as the pipeline of FIG. 3. The system includes a configuration service for selecting a subset of a plurality of database objects in a database associated with a first stage in the pipeline (e.g., stage 302(1)). The first stage executes a first data processing service such as service 304(1) to output the subset of the plurality of database objects selected by the configuration service. A second stage (e.g., stage 302(2)) executes a second data processing service such as service 304(2) and has another database associated therewith. A data host, communicatively coupled to the first and second stages, stores the selected subset of the plurality of database objects such that the execution of the first data processing service is asynchronous with respect to the execution of the second data processing service. The system also includes a propagation mechanism (not shown) for replicating the subset of the plurality of database objects stored in the data host to the other database associated with the second stage. In general, the invention is operable with any extensible, automatic data driven propagation mechanism.

The exemplary configuration service of the invention includes means for selecting the subset of the plurality of database objects in the database. Hardware and software such as a data structure, user interface, application program, application programming interface (API), and the like constitute means for selecting the subset of the plurality of database objects in the database. The propagation mechanism of the invention includes means for replicating the subset of the plurality of database objects stored in the data host to the other database associated with the second stage. Hardware and software such as an application program, API, database replication commands, and the like constitute means for replicating the subset of the plurality of database objects stored in the data host to the other database associated with the second stage. The invention also includes means for defining a plurality of output pipes for the database in the first stage. Hardware and software such as a data structure, user interface, application program, application programming interface (API), and the like constitute means for defining a plurality of output pipes for the database in the first stage.

The configuration service of the invention may access a data structure (e.g., in a configuration file) configuring a database in a stage. An exemplary data structure includes an input field, an output field, and an object field. The input field stores one or more values each representing an input pipe. The output field stores a plurality of values each representing an output pipe. The object field is associated with each of the plurality of values stored in the output field and identifies a subset of the plurality of database objects.

Figure 4:
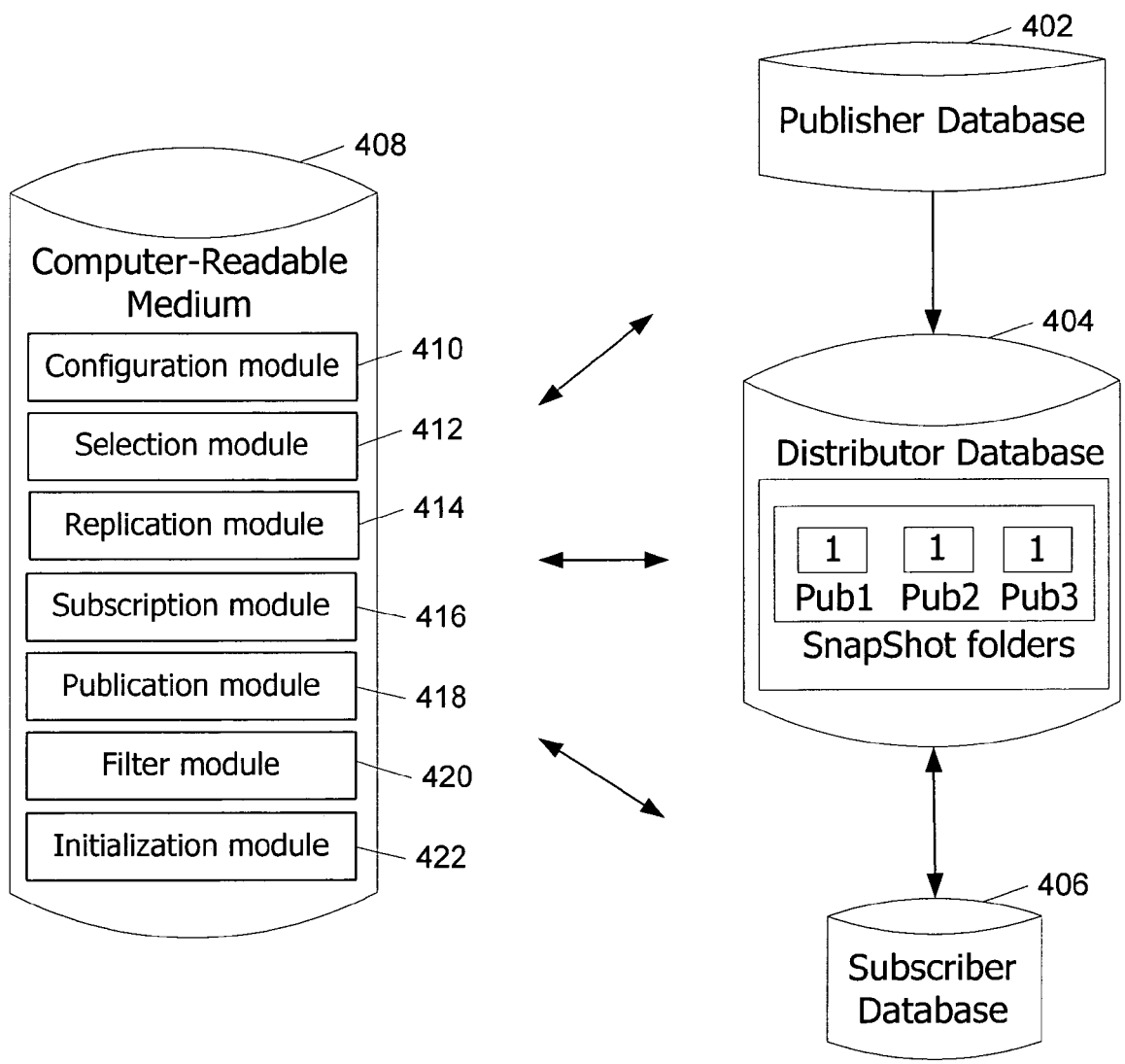
FIG. 4 is an exemplary block diagram illustrating data propagation based on replication.

Referring next to FIG. 4, an exemplary block diagram illustrates data propagation based on replication. The invention includes a publisher database 402, a distributor database 404, and a subscriber database 406. The invention defines publication from the producer stage (e.g., publisher database 402) which is consumed by the consumer stage (e.g., subscriber database 406). There may be any number of publications defined on the publisher stage. In general, subscription and publication are well known in the database context. However, with the invention, a stage may still access the database while subscribers are subscribing or the publisher is producing a new output pipe because the database is not detached and the data remains accessible in the single database.

In one embodiment, the propagation mechanism of the invention is implemented using snapshot replication. Using this approach, the invention maintains multiple publications such as Pub 1, Pub 2, and Pub 3 per database stage in snapshot folders, and the subscriber has an option to choose which version of data it is interested in. Subscribers have an option to choose which version of the published data to use. Although the default behavior is to choose the latest version, some subscribers may choose earlier versions (e.g., an earlier version may be helpful for testing a data-related issue). The publisher publishes the data using a new publication (e.g., with a new version number) whenever there is new data to publish and the distributor maintains multiple publications. Multiple publications may be achieved with double buffering, but the publisher does not overwrite any existing, published data. The subscriber is able to read the data while the publisher is producing a new version.

In one embodiment, one or more computer-readable media such as computer-readable medium 408 have computer-executable components, modules, or the like for processing a plurality of database objects in a database. The components interact with the publisher database 402, the distributor database 404, and the subscriber database 406. Exemplary components include a configuration module 410, a selection module 412, a replication module 414, a subscription module 416, a publication module 418, a filter module 420, and an initialization module 422. The configuration module 410 defines a plurality of output pipes for one database in a stage in a pipeline. The database has a plurality of database objects stored therein. The selection module 412 specifies a subset of the plurality of database objects in the database for each of the plurality of output pipes defined by the configuration module 410. The replication module 414 propagates, from the stage to another stage, the subset of the plurality of database objects specified by the selection module 412. In one embodiment, the replication module 414 propagates the subset of the plurality of database objects specified by the selection module 412 without accessing a file system. In particular, because the replication is maintained by the database server, abstract replication application programming interfaces (APIs) replicate the data directly to the subscriber. The subscription module 416 defines a subscription as a function of the subset of the plurality of database objects specified by the selection module 412. For example, the subscription module 416 defines a subscription to include only those database objects in the subset of the plurality of database objects specified by the selection module 412. The publication module 418 generates a publication as a function of the subscription defined by the subscription module 416. For example, the publication module 418 generates a publication that corresponds to the subscription by generating a publication having the specific data (e.g., rows and columns) requested in the subscription. The filter module 420 filters the data used to generate the publication in module 418 by removing a row or a column from the data. The initialization module 422 initializes the plurality of output pipes defined by the configuration module 410.

Referring next to FIG. 5, an exemplary flow chart illustrates operation of software implementing an embodiment of the invention in a database pipeline having a plurality of stages. Each of the plurality of stages has at least one database associated therewith. The database has one or more input pipes and a plurality of output pipes. A method processes a plurality of database objects in the database via the database pipeline. The method includes defining a plurality of output pipes for the database at 502 and defining one or more input pipes. The database has a plurality of database objects stored therein. The method further includes specifying a subset of the plurality of database objects in the database for each of the defined plurality of output pipes at 504. The method also includes defining a subscription at 506 as a function of the specified subset of the plurality of database objects and propagating, from a first one of the stages to another one of the stages, the specified subset of the plurality of database objects as a function of the defined subscription at 508. For example, the subscription includes a request for the specified subset of the plurality of database objects. Further, propagating includes propagating only those database objects identified in the subscription. Propagating the specified subset of the plurality of database objects includes, in one embodiment, replicating the specified subset of the plurality of database objects without accessing a file system. The method also includes creating and/or generating a publication as a function of the propagated subset of the plurality of database objects at 512. In one embodiment, defining the publication includes defining which objects are associated with which output pipe. Generating the publication includes publishing the data for the next stage to consume.

The method further includes processing that is customizable by a user, developer, or the like. For example, the processing may include prefixing or adding a source identifier to each of the specified subset of the plurality of database objects to identify the source of each therein, initializing one or more of the input pipes as a function of the created publication (e.g., initializing the input pipes based on the configuration specified in the publication), and initializing the defined plurality of output pipes. In addition, the method may include filtering the selected subset of the plurality of database objects horizontally and/or vertically at 510. During horizontal filtering, one or more of a plurality of data rows are eliminated from the selected subset of the plurality of database objects. During vertical filtering, one or more of a plurality of data columns are eliminated from the selected subset of the plurality of database objects. Further, the invention enables generalized filtering such as shown below.

```
<DBObjectGroup dbObjectGroupId="dbobjects1"
dbObjectGroupDescription="DB Objects 1">
<DBObjects>
<DBObject type="table" columns="column1, column2"
clause="column2='true'"sName="table1"
preCreationMethod="truncate"/>
<DBObject type="func" sName="func1" preCreationMethod="drop"/>
<DBObject type="sproc" sName="sproc1" preCreationMethod="drop"/>
<DBObject type="view" sName="view1" preCreationMethod="drop"/>
</DBObjects>
</DBObjectGroup>
```

In one embodiment, one or more computer-readable media have computer-executable instructions for performing the method illustrated in FIG. 5. The operations illustrated in FIG. 5 are described in greater detail with respect to FIG. 6A, FIG. 6B, FIG. 7A, and FIG. 7B.

Figure 6A:
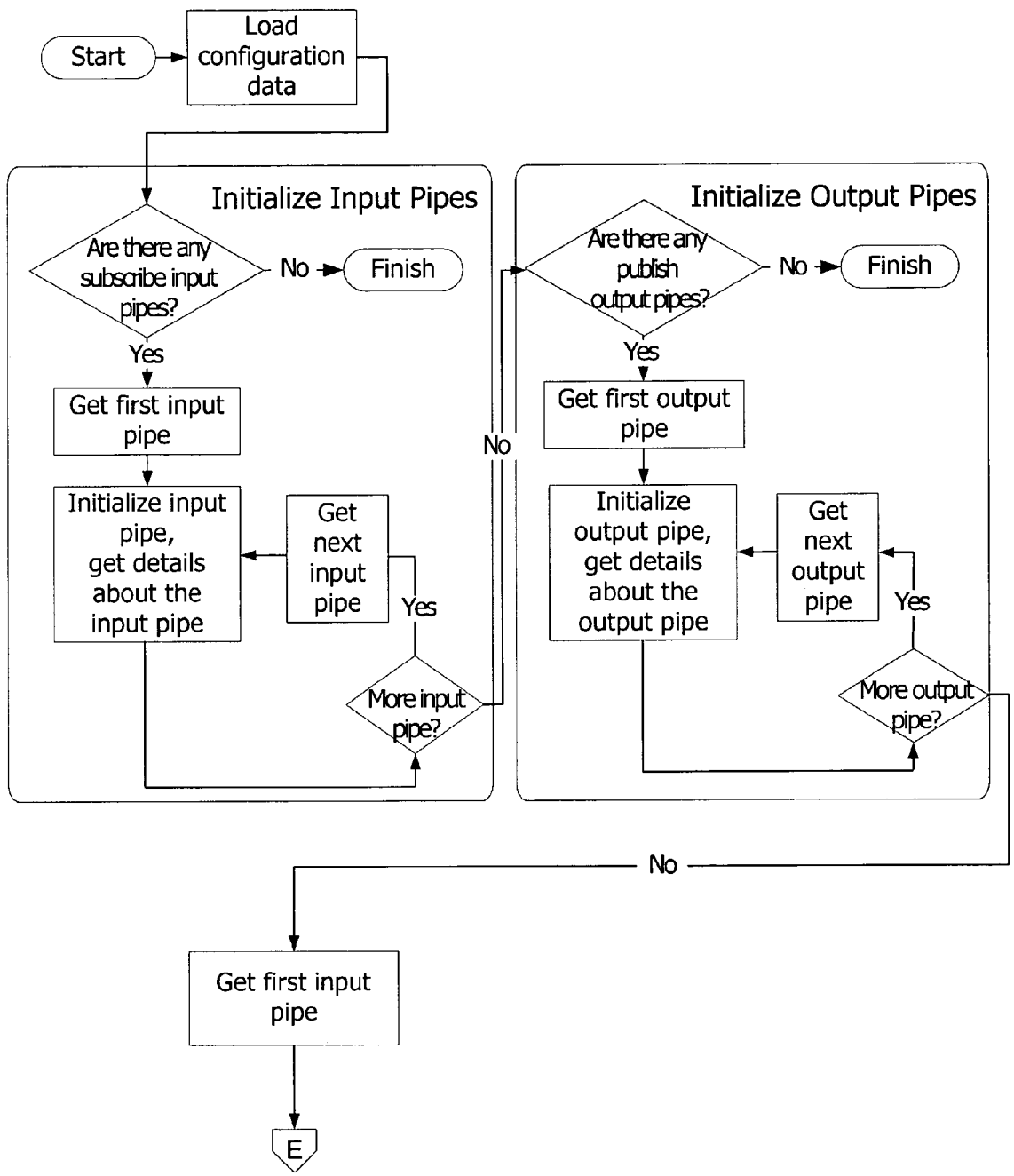
FIG. 6A and FIG. 6B are exemplary flow charts illustrating the propagation of data across stages.
Figure 6B:
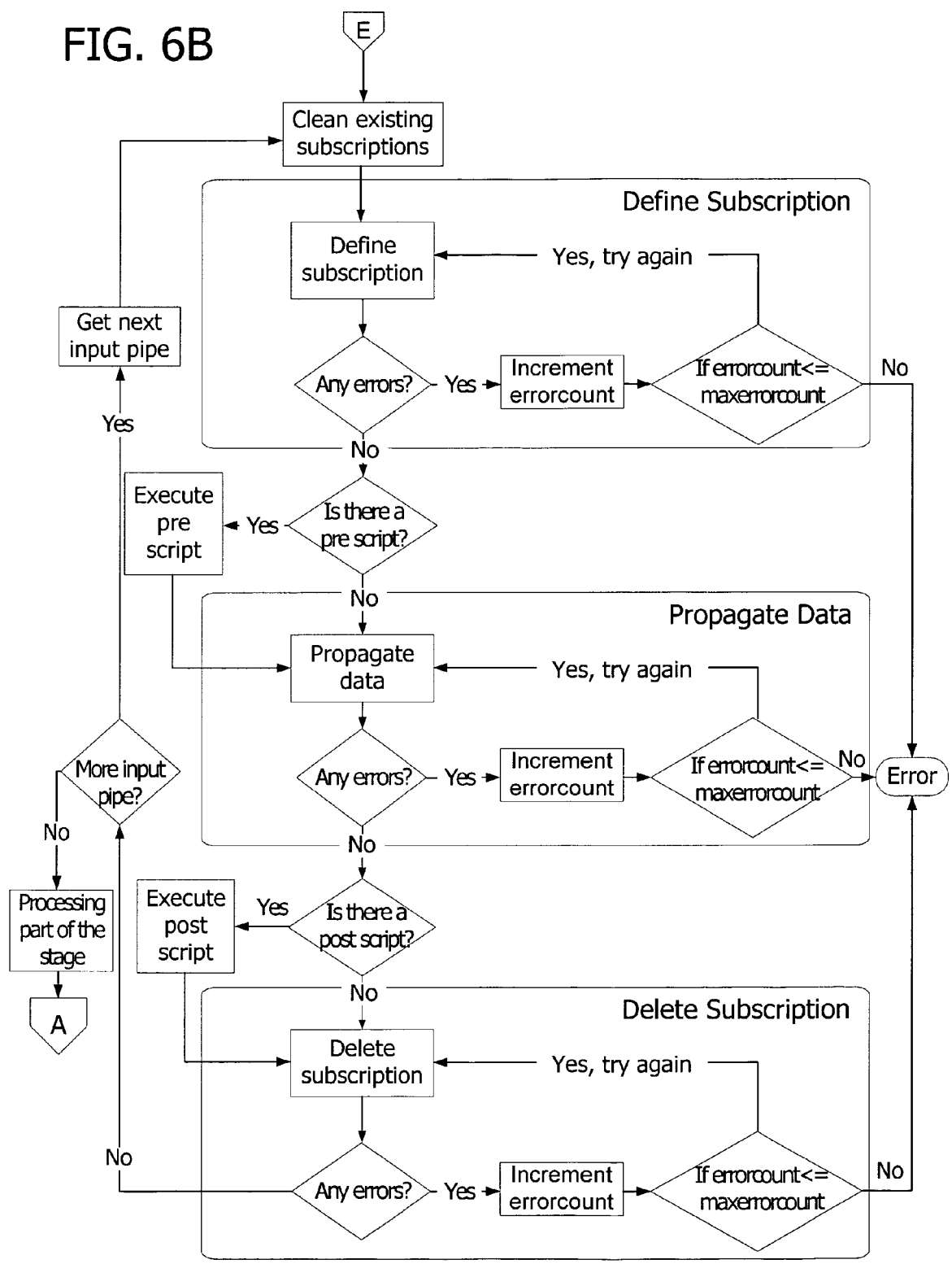

Referring next to FIG. 6A and FIG. 6B, exemplary flow charts illustrate the propagation of data across stages. In particular, FIG. 6A illustrates the initialization of input and output pipes. Initialization includes making connections between databases (if needed), between servers (if databases are hosted on different servers), and generally performing operations to prepare for the propagation. FIG. 6B illustrates defining a subscription, propagating data, and deleting old subscriptions.

In one embodiment, data replication occurs in the following manner. When a stage is ready for importing new data from the previous stage (e.g., is ready for replicating the snapshot created by the previous stage), software, hardware, and/or the like associated with the stage operates to read the configuration file to get information about the stage and any data sources. For each DBSubscribeInputPipe defined in the configuration for this pipeline stage, the software obtains information about that distributor, publisher, publication, and the actual publication name (e.g., specified as a version number). The software starts the subscription using a SQLDistribution COM object. The SQLDistribution COM objects abstracts the invocation of the agent which replicates the data at the subscriber. A Run method associated with the object returns only after the completion of the replication, or if there is an error. After replication, the software reads the configuration again to follow more steps if needed for this particular pipeline stage. After completion of processing, the software publishes the new data to the next stages as illustrated and described with reference to FIG. 7A and FIG. 7B.

Figure 7A:
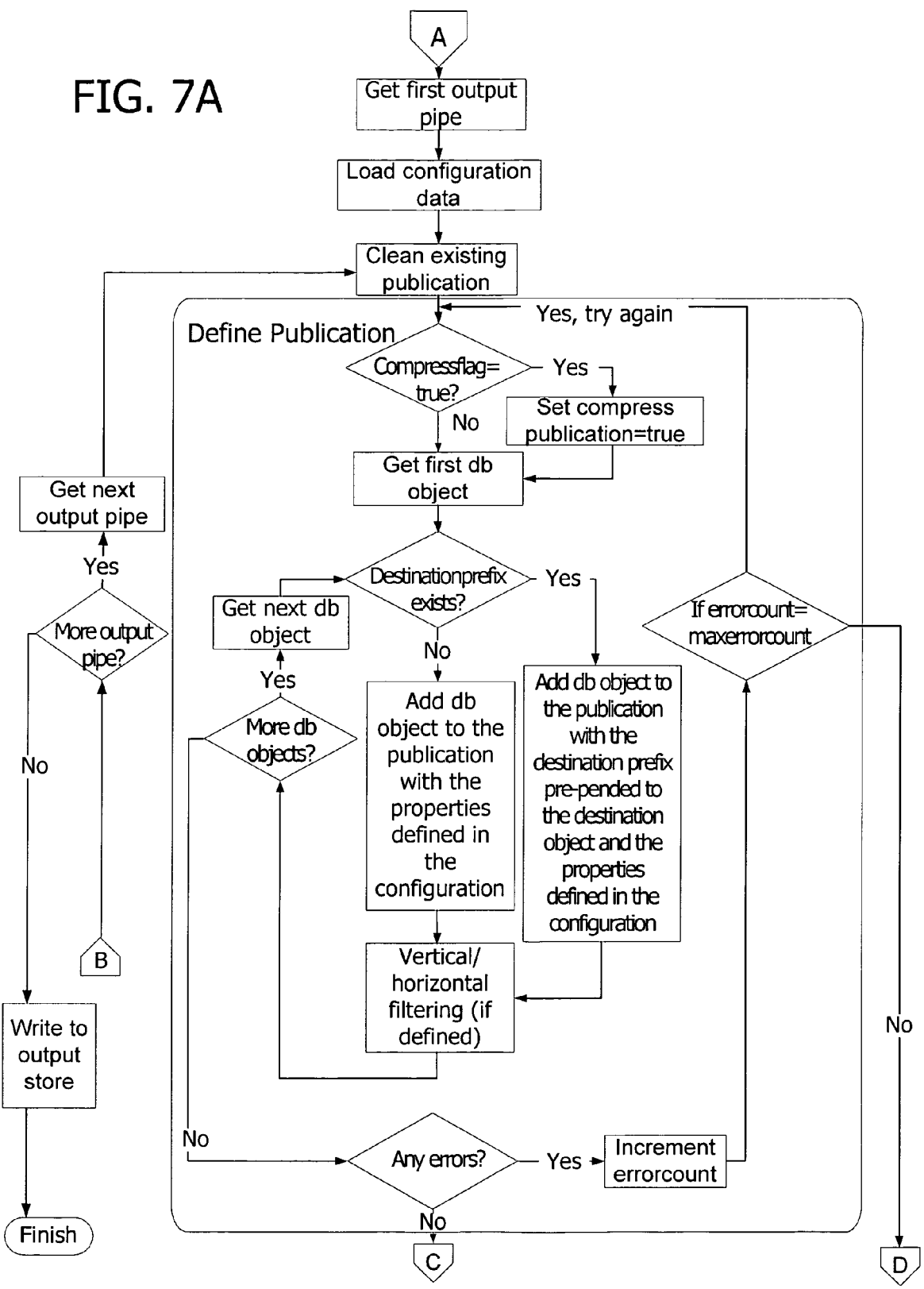
FIG. 7A and FIG. 7B are exemplary flow charts illustrating the definition of publications.
Figure 7B:
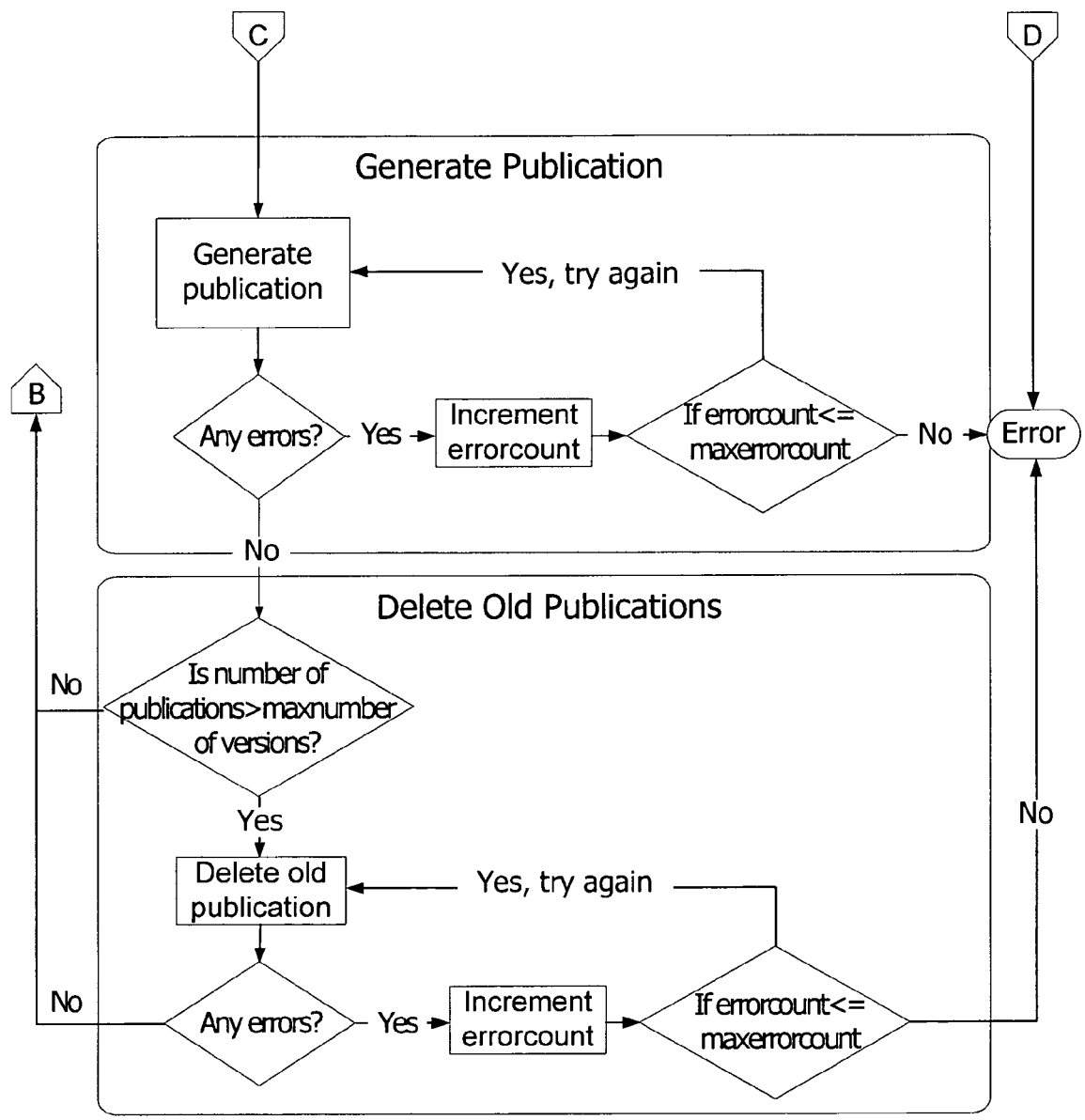

Referring next to FIG. 7A and FIG. 7B, exemplary flow charts illustrate the creation and management of publications. FIG. 7A illustrates an exemplary method involved in defining a publication. The method in FIG. 7B generates the publication and deletes old publications. For example, the invention maintains a counter representing a quantity of created publications by incrementing the counter each time a publication is created. If the invention determines that the incremented counter exceeds a pre-defined threshold, the invention deletes a previously created publication.

In one embodiment, the invention publishes new data from a pipeline stage in the following manner. When the stage is ready for publishing, software, hardware, and/or the like associated with the stage operates to read the configuration file. For each publication specified in the publications list in the configuration file, the software obtains a new version number and uses the obtained number as the publication name. The software creates the new publication for the output database. The publication is enabled for anonymous access by any subscriber. Listed below is an exemplary publication description.

Name=<new version number>;
Alternate Snapshot Folder =<alternate snapshot folder>;
Replication Frequency =<Replication frequency>in this case it will be determined by the pipeline stage.

The following pseudo code describes the addition of articles from the list specified in a corresponding dbObjectGroupId reference.

For each article defined in dbObjectGroupId
  SourceObjectName=<Input stage database object name>
  SourceObjectOwner=<Input stage database owner name default to dbo>
  DestinationObjectName=<Current/Subscribing stage database object name>
  DestinationObjectOwner=<Current/Subscribing stage database owner default to dbo>
  PreCreationMethod=pre creation method (e.g., truncate, drop, or nothing)

Every publication is named using the publication name and version number in the following form: <publication name>_<version number>. The software adds the publication to the publication collection for the output database and creates a snapshot of the newly created publication. In one embodiment, a SnapshotAgent is used to create the snapshot. Alternatively, a SQLSnapShot Common Object Model (COM) object is used to create the snapshot. The SQLSnapShot COM object abstracts the creation of the snapshots. An Initialize method validates control properties and establishes all database connections. A Run method of the object may be invoked to run the agent (e.g., execute the replication process using the control properties). The Run method blocks and returns only when the snapshot is done (and returns the appropriate return code). Instead of monitoring the agent about the status of the snapshot, the Run method directly provides the required functionality. A Terminate method terminates the replication process and closes all database connections.

After the publication has been created, the software creates an entry in a corresponding message store including the publication name and the version number such as shown below.

```
<MessageStore AppName="dps_transform_sonylabel_cms"
ReplicationPub="cms_interlink_sony" LastUpdated="2005-02-
06T15:35:06.8015794-08:00" Version="476580889706">
  <Source Information>
  ...
</MessageStore>
```

The software deletes the old publication leaving a pre-defined, configurable number of publications. Alternatively or in addition, a delay delete feature deletes a specific publication only after the publisher determines that the specific publication should be deleted and that no subscriber is using the specific publication.

Exemplary Operating Environment

Figure 8:
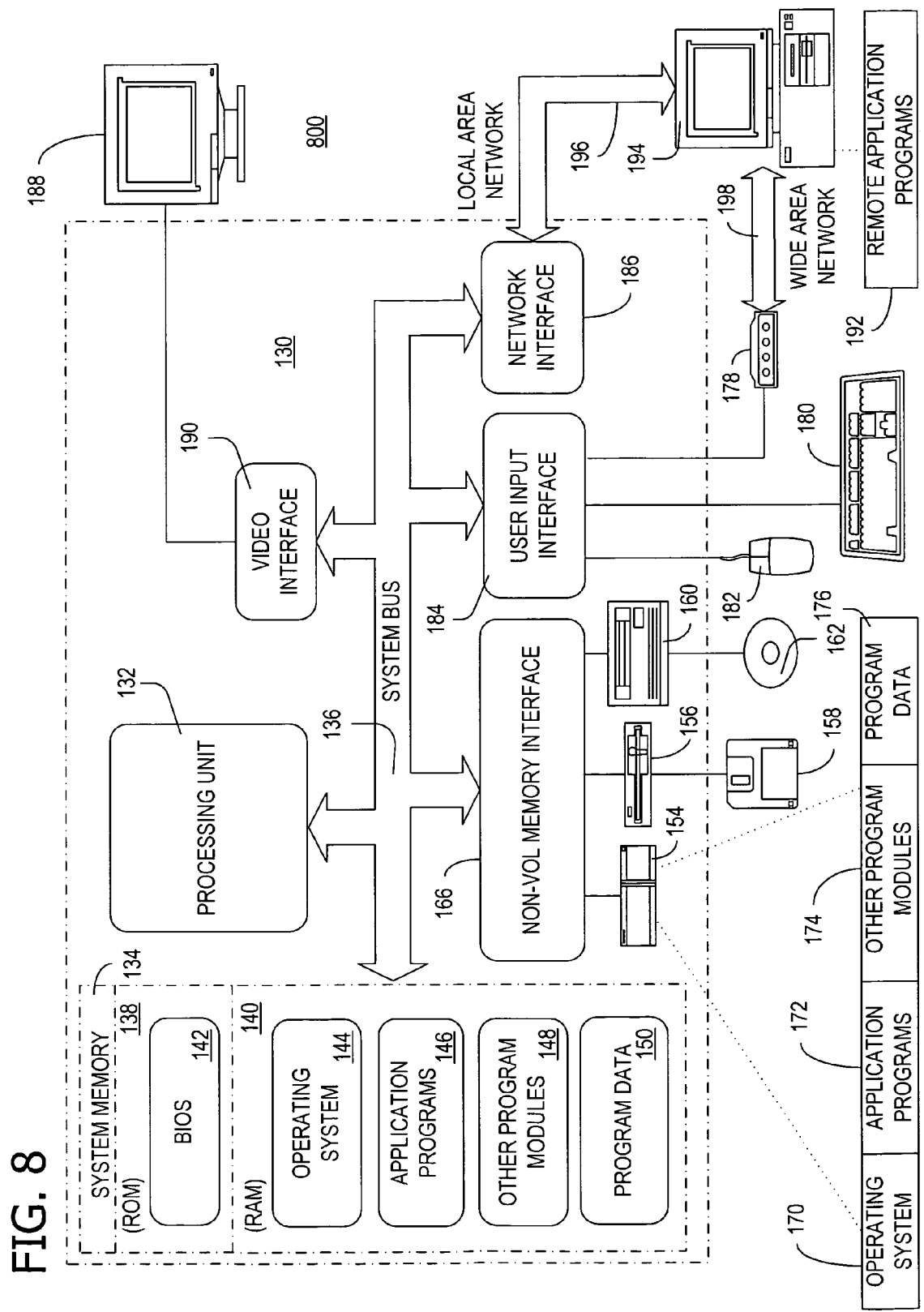
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 5, FIG. 6A, FIG. 6B, FIG. 7A, and FIG. 7B to implement embodiments of the invention. In one embodiment, the invention is implemented with SQL server replication, the C# programming language (e.g., to program the SQL server or as a driver for the SQL database), and the extensible markup language (XML). While embodiments of the invention may have been described herein with reference to SQL server replication, the invention may be implemented using any other database replication or transformation mechanism. Moreover, while C# is a high level language, the logic of the invention may be implemented in any other high level language. Further, XML is a universal format, but the invention is operable with any other format as well.

The following examples further illustrate the invention. The sample configuration file below is for the stage name called xxx_pipeline. It has defined an Input Pipe section, an Output pipe section, and a Processing section. Once the stage is done with its processing, it will generate the Output pipe as defined in the OutputPipe. There can be any number of output pipes associated with a single stages (as there might be different consumers, asking for different data from this stage). If multiple consumers are using the same data, then they can share the same output pipe produced by this stage. An output pipe in this example is a replication-based publication with the name (publicationName attribute)+(version number associated with the output pipe). It contains the DB Objects as defined by the dbObjectGroupId. The follow code excerpt illustrates configuration of stages and input and output pipes of an exemplary pipeline.

```
<PipelineStage appName="xxx_pipeline" expectedMaxDuration="P0Y0M0DT10H0M0S">
<WorkingDir volume="XXX_PIPELINE"/>
<Database name=" xxx_pipeline">
<Server>Machine1</Server>
</Database>
<InputPipes>
<... Input Pipes ...>
<DBSubscribeInputPipe appName="input1" publicationName="input1Publication"/>
<DBSubscribeInputPipe appName="input2" publicationName="input2Publication"/>
```

-continued

```
</InputPipes>
<OutputPipes>
<DBPublishOutputPipe publicationName="xxxOutput1" dbObjectGroupId="dbobjects1"/>
<DBPublishOutputPipe publicationName="xxxOutput2" dbObjectGroupId=" dbobjects2" destinationPrefix="xxx"/>
</OutputPipes>
<... Processing ... >
<... Stage Dependency ... >
</PipelineStage>
<PipelineStage appName="yyy_pipeline" expectedMaxDuration="P0Y0M0DT10H0M0S">
<WorkingDir volume="YYY_PIPELINE"/>
<Database name=" yyy_pipeline">
<Server>Machine2</Server>
</Database>
<InputPipes>
<... Input Pipes ... >
<DBSubscribeInputPipe appName="xxx_pipeline" publicationName="input1"/>
</InputPipes>
<OutputPipes>
<DBPublishOutputPipe publicationName="yyyOutput2" dbObjectGroupId=" dbobjects3" destinationPrefix="yyy"/>
</OutputPipes>
<... Processing ... >
<... Stage Dependency ... >
</PipelineStage>
```

The following code excerpt illustrates the selection of the subset of the plurality of database objects in the database.

```
<DBObjectGroup dbObjectGroupId="dbobjects1" dbObjectGroupDescription="DB Objects 1">
<DBObjects>
<DBObject type="table" sName="table1" dName=="destinationtable1" preCreationMethod="truncate"/>
<DBObject type="func" sName="func1" preCreationMethod="drop"/>
<DBObject type="sproc" sName="sproc1" preCreationMethod="drop"/>
<DBObject type="view" sName="view1" preCreationMethod="drop"/>
</DBObjects>
</DBObjectGroup>
<DBObjectGroup dbObjectGroupId="dbobjects2" dbObjectGroupDescription="DB Objects 1">
<DBObjects>
<DBObject type="table" sName="*" preCreationMethod="truncate"/>
</DBObjects>
</DBObjectGroup>
```

For the exemplary xxxOutput1 output pipe defined above, dbObjects1 defines the list of the database objects to be included in the output publication. There may be any type of database objects in the output publication (e.g., table, stored procedure, user defined functions or views). With each database object, the invention provides the ability to define the pre-creation method to execute before replicating the data. For example, the user, developer, or the like may specify tables to be truncated before replicating the new data. Alternatively or in addition, if the user wants to preserve the old data, there is no need to truncate. The drop function is useful for recreating the schema every time any stage gets the new data.

The xxxOutput2 output pipe defined above has a different set of database objects associated with it and has a destination prefix defined. This adds an xxx prefix to all the database objects when subsequent stages get the data. This is useful when one stage is consuming data from multiple stages having database objects with the same name. In particular, this feature is useful when trying to merge data from different data providers which has already been converted to a common format with the same schema. For a different set of the database objects which may be used by different subsequent stages, there is one output pipe (DBPublishOutputPipe). The DBPublishOutputPipe element creates the anonymous publication, which can be consumed by anybody, so the publishers do not need to know about the subscribers.

The second pipeline stage yyy_pipeline depends upon the output generated by the xxx_pipeline, as mentioned by the following input pipe.

<DBSubscribeInputPipe appName="xxx_pipeline" publicationName="input1"/>

This is a DBSubscribeInputPipe element which subscribes the data produced by the xxx_pipeline for publication input1. The data is replicated to the stage database using the properties defined at the publication level (e.g., prefixing or any filtering). The invention also has the ability to execute some pre-script (e.g., before propagating the data) and post-script (e.g., after propagating the data).

An exemplary structure for the DBPublishOutputPipe element is as follows.

```
<DBPublishOutputPipe publicationName="xxxOutput1" dbObjectGroupId="dbobjects1" compress="true" destinationPrefix="xxx" numberOfVersionsToKeep="2"/>
```

In the above structure, publicationName is the name for the Output pipe (e.g., the prefix of the actual publication name). The dbObjectGroupId field is the reference identifier for the list of database objects to include in this publication. The compress field indicates whether to compress the publication or not. The destinationPrefix field adds a prefix to all the database objects while replicating the data to distinguish database objects with the same name from different input pipes. The numberOfVersionsToKeep field specifies the number of versions to keep.

An exemplary structure for the DBSubscribeInputPipe element is as follows.

```
<DBSubscribeInputPipe appName="xxx_pipeline"
publicationName="input1"
dbName="new_db" preScript="drop_index"
postScript="create_index"/>
```

In the above structure, the appName field represents a stage name of the input pipe name. The publicationName field represents the name of the output pipe (e.g., publication name) from the input stage. The dbName field identifies the database to which the data should be replicated. By default, data is replicated to the stage database. The prescript field identifies a script to be executed before replicating the data. The postscript field identifies a script to be executed after replicating the data.

An exemplary structure for the DBObject element is as follows.

```
<DBObject type="table" sName="sTable" sOwner="dbo"
dName="dTable"dOwner="dbo" preCreationMethod="truncate"/>
```

The type field specifies the type of the database objects (e.g., table, sproc, view, func). The sName field identifies the source database object name. The sOwner field identifies the source ownership. The dName field identifies the destination name (e.g., the source name is the default). The dOwner field identifies the destination ownership. The preCreationMethod field identifies a pre-creation method (e.g., none, delete, drop, truncate).

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

A sample configuration file is shown below.

```
<PipelineStage appName="dps_transform_sonylabel_cms"
schema="PipelineStage.xsd" sleepInterval="PT30M"
featureSet="MUSICSTORE_DLS_DPS" expectedMaxDuration="PT2H"
watchdogMonitored="true">
    <WorkingDir volume="MUSICSTORE_PIPELINE"/>
    <Database name="CMSSonyDataStore">
        <Server substitution="MUSICSTORE-MACHINE" position="1"/>
    </Database>
    <InputPipes>
        <DBSubscribeInputPipe appName="dps_wmisdatastore_data" publicationName="WMISDataStore"/>
        <DBSubscribeInputPipe appName="dls_sonylabel_data" publicationName="dls_sonylabel" preScript="DropSonyIndexes" postScript="CreateSonyIndexes"/>
        <FileInputPipe appName="fps_sonylabel_cd_images"/>
    </InputPipes>
    <OutputPipes>
        <DBPublishOutputPipe publicationName="cms_sony" dbObjectGroupId="CMSAllTableObjects" destinationPrefix="sony"/>
        <DBPublishOutputPipe publicationName="cms_interlink_sony" dbObjectGroupId="CMSInterlinking" destinationPrefix="sony"/>
    </OutputPipes>
    <DTSRun package="Transform DataProvider To CMS">
        <Parameter name="RegisterEntities">1</Parameter>
        <Parameter name="FlattenTrackPeeps">false</Parameter>
        <RefParameter appName="PipelineStage" attribute="Database/Server" variable="TransformCMSServer"/>
        <RefParameter appName="PipelineStage" attribute="Database/@name" variable="TransformCMSDB"/>
        <RefParameter appName="fps_sonylabel_cd_images" attribute="WorkingDir" variable="CoversManifestDir"/>
    </DTSRun>
    <MessageStore appName="dps_transform_sonylabel_cms" volume="MUSICSTORE_PIPELINE">
        <ExecutionDependency operator="OR">
            <App appName="dps_wmisdatastore_data"/>
            <App appName="dls_sonylabel_data"/>
            <App appName="fps_sonylabel_cd_images"/>
        </ExecutionDependency>
```

-continued

```xml
        <TimeDependency operator="AND" startTime="15:20:00" duration="PT15M"/>
      </MessageStore>
    </PipelineStage>
    <PipelineStage appName="dps_interlink_music" sleepInterval="PT2H" schema="PipelineStage.xsd" featureSet="MUSICSTORE_DLS_DPS" expectedMaxDuration="PT3H" watchdogMonitored="true">
      <WorkingDir volume="MUSICSTORE_PIPELINE"/>
      <Database name="Interlink_Music_v1">
        <Server substitution="MUSICSTORE-MACHINE" position="1"/>
      </Database>
      <InputPipes>
        <DBSubscribeInputPipe appName="dps_wmisdatastore_data" publicationName="WMISDataStore"/>
        <DBSubscribeInputPipe appName="dps_transform_amgpop_cms" publicationName="cms_interlink_amgpop" preScript="cms_index_Drop_AMG" postScript="cms_index_AMG"/>
        <DBSubscribeInputPipe appName="dps_transform_sonylabel_cms" publicationName="cms_interlink_sony" preScript="cms_index_Drop_SONY" postScript="cms_index_SONY"/>
        ...
        ...
      </InputPipes>
      <OutputPipes>
        <DBPublishOutputPipe publicationName="interlink_music_pub" dbObjectGroupId="interlink_music" destinationPrefix="interlink"/>
      </OutputPipes>
      <DTSRun package="Interlink Music">
        <RefParameter appName="PipelineStage" attribute="Database/Server" variable="Music_server"/>
        <RefParameter appName="PipelineStage" attribute="Database/@name" variable="Music_db"/>
      </DTSRun>
      <MessageStore appName="dps_interlink_music" volume="MUSICSTORE_PIPELINE">
        <ExecutionDependency operator="OR">
          <App appName="dps_wmisdatastore_data"/>
          <App appName="dps_transform_aec_cms"/>
          <App appName="dps_transform_amgpop_cms"/>
          <App appName="dps_transform_sonylabel_cms"/>
          ...
          ...
          <!-- awaiting integration -->
        </ExecutionDependency>
        <TimeDependency operator="AND" startTime="18:00:00" duration="PT1H"/>
      </MessageStore>
    </PipelineStage>
    <PipelineStage appName="dps_publish_musicstore" sleepInterval="PT3H" schema="PipelineStage.xsd" featureSet="MUSICSTORE_DLS_DPS" expectedMaxDuration="PT10H" watchdogMonitored="true">
      <WorkingDir volume="MUSICSTORE_PIPELINE"/>
      <Database name="Publish_MusicStore_v1">
        <Server substitution="MUSICSTORE-MACHINE" position="1"/>
      </Database>
      <InputPipes>
        <DBSubscribeInputPipe appName="dps_wmisdatastore_data" publicationName="WMISDataStore"/>
        <DBSubscribeInputPipe appName="dps_interlink_music" publicationName="interlink_music_pub"/>
        <DBSubscribeInputPipe appName="dls_amg_data" publicationName="AMGCDPopMusicStore"/>
        <DBSubscribeInputPipe appName="dps_transform_sonylabel_cms" publicationName="cms_sony" preScript="cms_index_Drop_SONY" postScript="cms_index_SONY"/>
        ...
        ...
        <DBSubscribeInputPipe appName="dps_override_transform_cms" publicationName="cms_override" preScript="cms_index_Drop_OVERRIDE" postScript="cms_index_OVERRIDE"/>
      </InputPipes>
      <OutputPipes>
        <DBPublishOutputPipe publicationName="musicstore" dbObjectGroupId="MusicStorePub"/>
        <DBPublishOutputPipe publicationName="musicstoreinc" dbObjectGroupId="MusicStorePub" destinationPrefix="store"/>
```

-continued

```
    <DBPublishOutputPipe publicationName="musicstoreidmap"
dbObjectGroupId="MusicStoreIdMapPub"/>
    </OutputPipes>
    <DTSRun package="Publish MusicStore">
      <RefParameter appName="PipelineStage"
attribute="Database/Server" variable="MusicStore_server"/>
      <RefParameter appName="PipelineStage"
attribute="Database/@name" variable="MusicStore_db"/>
    </DTSRun>
    <MessageStore appName="dps_publish_musicstore"
volume="MUSICSTORE_PIPELINE">
      <ExecutionDependency operator="AND">
        <App appName="dps_interlink_music"/>
      </ExecutionDependency>
      <TimeDependency operator="AND" startTime="20:00:00"
duration="PT2H"/>
    </MessageStore>
  </PipelineStage>
    A sample message store is shown below.
<?xml version="1.0" encoding="utf-8"?>
<MessageStore xmlns:xsd="http://www.w3.org/2001/XMLSchema"
xmlns:xsi="http://www.w3.org/2001/XMLSchema-instance"
AppName="dps_publish_musicstore" ReplicationPub="musicstoreinc"
LastUpdated="2005-01-31T02:31:09.3913755-08:00"
Version="476014943175">
  <Source AppName="dps_wmisdatastore_data"
ReplicationPub="WMISDataStore" DataVersion="475797059793" />
  <Source AppName="dps_interlink_music"
ReplicationPub="interlink_music_pub" DataVersion="475994518337" />
  <Source AppName="dps_transform_sonylabel_cms"
ReplicationPub="cms_Sony" DataVersion="475889335002" />
  . . .
  . . .
</MessageStore>
```

What is claimed is:

1. A database pipeline system, comprising a processor coupled to a memory including:
   a first stage having a first database including first objects and having a first output pipe, said first stage:
   specifying a subset of the first objects;
   creating for the first output pipe a first publication defining the first subset of the first objects;
   a second stage having a second database having a second input pipe for receiving first subset of objects from the first output pipe and having a second output pipe, said second stage:
   defining a first subscription associated with the second input pipe wherein the first subscription subscribes to the first publication;
   propagating the first subset of the first objects defined by the first publication from the first stage to the second stage, said second database receiving the first subset of first objects via the second input pipe, wherein propagating comprises replicating the first subset of first objects from the first database to the second database without accessing a file system;
   specifying a second subset of the first objects replicated in the second database wherein the first subset is different than the second subset; and
   creating for the second output pipe a second publication defining the second subset of the first objects;
   a third stage having a third database having a third input pipe receiving database objects from the second output pipe and a third output pipe, said third stage:
   defining a second subscription associated with the third input pipe wherein the third input pipe of the third stage is defined as a function of a second publication, said second publication being created from a subset of the second objects specified for a second output pipe;
   propagating, from the second stage to the third stage, the specified subset of the second objects as a function of the defined second subscription, wherein propagating comprises replicating the specified subset of second objects without accessing a file system;
   specifying a subset of the third objects for the third output pipe wherein the third subset is different than the second subset; and
   creating for the third output pipe a third publication defining the third subset of the first objects.

2. The database pipe system of claim 1, further comprising creating a plurality of second publications, each of said publication being a different version of the second subset of the first objects wherein a subscriber selects one of the plurality of second publications to subscribe to.

3. The database pipe system of claim 2, further comprising:
   incrementing a counter representing a quantity of created second publications;
   determining if the incremented counter exceeds a pre-defined threshold; and
   deleting a previously created second publication as a function of said determining.

4. The database pipe system of claim 1, wherein the first subset of objects comprises a plurality of data rows in the database, and further comprising filtering the first subset of first objects horizontally by eliminating one or more of the plurality of data rows from the first subset of first objects.

5. The database pipe system of claim 1, wherein the first subset of first objects comprises a plurality of data columns in the database, and further comprising filtering the first subset of first objects vertically by eliminating one or more of the plurality of data columns from the first subset of first objects.

6. The database pipe system of claim 1, further comprising:
adding a first source identifier to each of the first subset of first objects of the first publication;
adding a second source identifier to each of the second subset of first objects in the, said first source identifier being different than said second identifier and distinguishing the second subset of first objects from the first subset of first objects.

7. One or more computer storage media storing computer-executable components for processing a plurality of database objects in a database, said components comprising:
a first stage having a first database including first objects and having a first output pipe, said first stage:
specifying a subset of the first objects;
creating for the first output pipe a first publication defining the first subset of the first objects;
a second stage having a second database having a second input pipe for receiving first subset of objects from the first output pipe and having a second output pipe, said second stage:
defining a first subscription associated with the second input pipe wherein the first subscription subscribes to the first publication;
propagating the first subset of the first objects defined for the first publication from the first stage to the second stage, said second database receiving the first subset of first objects via the second input pipe, wherein propagating comprises replicating the first subset of first objects from the first database to the second database without accessing a file system; and
specifying a second subset of the first objects replicated in the second database wherein the first subset is different than the second subset; and
creating for the second output pipe a second publication defining the second subset of the first objects;
a third stage having a third database having a third input pipe receiving database objects from the second output pipe and a third output pipe, said third stage:
defining a second subscription associated with the third input pipe wherein the third input pipe of the third stage is defined as a function of a second publication, said second publication being created from a subset of the second objects specified for a second output pipe;
propagating, from the second stage to the third stage, the specified subset of the second objects as a function of the defined second subscription, wherein propagating comprises replicating the specified subset of second objects without accessing a file system;
specifying a subset of the third objects for the third output pipe wherein the third subset is different than the second subset; and
creating for the third output pipe a third publication defining the third subset of the first objects.

8. The computer readable storage media of claim 7, further comprising creating a plurality of second publications, each of said publication being a different version of the second subset of the first objects wherein a subscriber selects one of the plurality of second publications to subscribe to.

9. The computer readable storage media of claim 8, further comprising:
incrementing a counter representing a quantity of created second publications;
determining if the incremented counter exceeds a pre-defined threshold; and
deleting a previously created second publication as a function of said determining.

10. The computer readable storage media of claim 7, wherein the first subset of objects comprises a plurality of data rows in the database, and further comprising filtering the first subset of first objects horizontally by eliminating one or more of the plurality of data rows from the first subset of first objects.

11. The computer readable storage media of claim 7, wherein the first subset of first objects comprises a plurality of data columns in the database, and further comprising filtering the first subset of first objects vertically by eliminating one or more of the plurality of data columns from the first subset of first objects.

12. The computer readable storage media of claim 7, further comprising:
adding a first source identifier to each of the first subset of first objects of the first publication;
adding a second source identifier to each of the second subset of first objects, said first source identifier being different than said second identifier and distinguishing the second subset of first objects from the first subset of first objects.

13. A method for processing a plurality of database objects in a database, said components comprising:
defining a first stage having a first database including first objects and having a first output pipe;
specifying a subset of the first objects;
adding a first source identifier to each of the first subset of first objects;
creating for the first output pipe a first publication defining the first subset of the first objects including the first source identifiers;
defining a second stage having a second database having a second input pipe for receiving first subset of objects from the first output pipe and having a second output pipe;
defining a first subscription associated with the second input pipe wherein the first subscription subscribes to the first publication;
propagating the first subset of the first objects defined for the first publication from the first stage to the second stage, said second database receiving the first subset of first objects via the second input pipe, wherein propagating comprises replicating the first subset of first objects from the first database to the second database without accessing a file system;
specifying a second subset of the first objects replicated in the second database wherein the first subset is different than the second subset;
adding a second source identifier to each of the second subset of first objects, said first source identifier being different than said second identifier and distinguishing the second subset of first objects from the first subset of first objects; and
creating for the second output pipe a second publication defining the second subset of the first objects including the second source identifiers;
defining a third stage having a third database having a third input pipe receiving database objects from the second output pipe and a third output pipe;
defining a second subscription associated with the third input pipe wherein the third input pipe of the third stage is defined as a function of a second publication, said second publication being created from a subset of the second objects specified for a second output pipe;
propagating, from the second stage to the third stage, the specified subset of the second objects as a function of the defined second subscription, wherein propagating comprises replicating the specified subset of second objects without accessing a file system;

specifying a subset of the third objects for the third output pipe wherein the third subset is different than the second subset;

adding a third source identifier to each of the third subset of first objects, said third source identifier being different than the first and second source identifiers and distinguishing the subset of first objects from the first and second subset of first objects; and creating for the third output pipe a second publication defining the second subset of the first objects including the third source identifiers.

* * * * *